C. W. STEWART.
VEHICLE TIRE.
APPLICATION FILED SEPT. 4, 1914.
1,232,406.
Patented July 3, 1917.
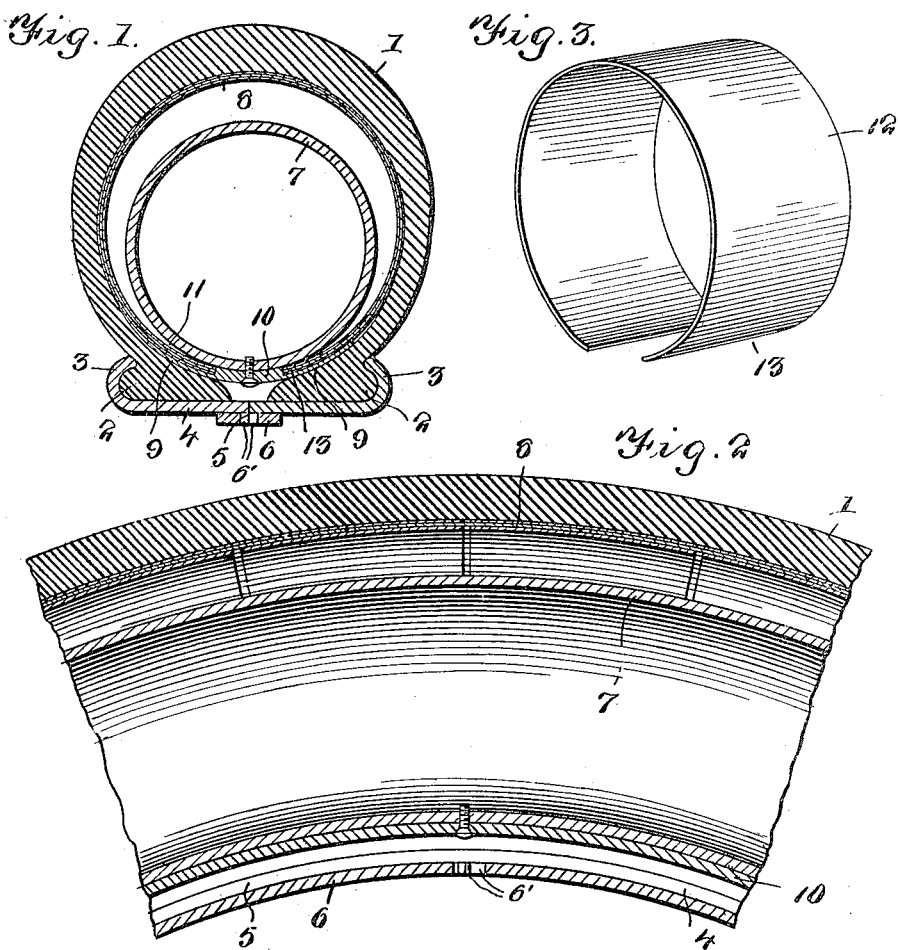
Witness
E. Q. Ruppert.
Inventor
Claude W. Stewart
By Victor J. Evans
Attorney

UNITED STATES PATENT OFFICE.

CLAUDE W. STEWART, OF MARTINSBURG, WEST VIRGINIA.

VEHICLE-TIRE.

1,232,406.  Specification of Letters Patent.  Patented July 3, 1917.

Application filed September 4, 1914. Serial No. 860,250.

*To all whom it may concern:*

Be it known that I, CLAUDE W. STEWART, a citizen of the United States, residing at Martinsburg, in the county of Berkeley and State of West Virginia, have invented new and useful Improvements in Vehicle-Tires, of which the following is a specification.

This invention relates to vehicle tires, the object in view being to provide a flexible and resilient supporter adapted particularly for sustaining in operative condition the outer case of a pneumatic tire, so as to dispense with the inner tube and the inflation of the tire, the said supporter being designed not only to take the place of the inner tube and the usual body of compressed air but being also puncture proof, thus doing away with punctures and blow-outs.

A further object of the invention is to provide in connection with said resilient tire supporter, means for limiting the degree to which the tire may be compressed when subjected to rough usage.

With the above and other objects in view, the invention consists in the novel construction, combination and arrangement of parts, as herein described, illustrated and claimed.

In the accompanying drawings:—

Figure 1 is a cross section through a tire constructed in accordance with the present invention, showing the preferred embodiment thereof.

Fig. 2 is a fragmentary vertical longitudinal section through the same.

Fig. 3 is a detail perspective view of one of the springs.

Referring to the drawings, 1 designates an outer case or shoe such as is now commonly employed in pneumatic tires said outer case being provided with the usual clencher beads 2 which are adapted to be held by the flanges 3 of a rim 4. This rim 4 is shown as of sectional construction, being divided along a central longitudinal line as indicated at 5 the two sections being held in proper relation to each other and the tire by means of a locking band 6 formed with holes to receive lugs 6' on the rim sections.

The invention contemplates the use of a resilient supporter for the outer case 1, said supporter comprising an inner member 7 and an outer member 8. The inner member 7 which may be termed the core of the supporter is in the form of an endless tube the same being practically rigid or non-resilient and extending continuously around the rim of the wheel and within the tire.

Secured to the inner or rim face of the member 7 is a circular plate or strip 9 provided on the face thereof adjacent to the core 7 with a central spacing rib 10 thereby forming slots or sockets 11 at opposite sides of the rib 10 in which the extremities of the springs forming the outer resilient member 8 of the supporter are received and held, the edge portions of the strip 9 forming flanges which lie against the outer faces of the springs 12 and retain said springs in place.

The outer resilient portion of the supporter is composed of several superimposed circular series of springs one of which is shown at 12 in Fig. 3. These springs as shown in Fig. 2 are arranged so as to overlap or break joint with each other and also with their adjacent edges out of actual contact with each other thereby enabling each and every spring to bend freely without the presence of any grinding contact between the edges of the springs. Furthermore by overlapping the springs in the manner shown, they mutually support and reinforce each other while preserving the rotundity of the tire and holding the outer case 1 efficiently distended. The extremities or margins 13 of the springs are all held in the sockets 11 formed between the projecting margins of the plate or strip 9 and the adjacent outer face of the core or inner member 7 as clearly shown in Fig. 1. Each of the springs 12 is furthermore made somewhat wider along its outer tread portion than at the margins 13 thereof in view of the fact that the tire is of greater circumference at the tread than at the rim face thereof. Furthermore each of the springs 12 is made slightly concavo-convex or rounding in a direction longitudinally of the complete tire so that it will conform to the general circumference and contour of the tire.

Under the arrangement above described, the inner member or core 7 forms an efficient support for confining the remainder of the resilient supporter and the outer case on the rim particularly when the tire is subjected to lateral thrust which takes place when the machine describes a short curve. This prevents any possibility of the tire being rolled out of the rim.

The supporter hereinabove described, when applied to a tire and rim in the manner illustrated and described, does away with the necessity of inflating the tire and also dispenses with the use of an inner tube, the tire being sustained in proper condition by means of said supporter, and the main body of the supporter being safeguarded by the interiorly arranged core or auxiliary supporter which serves to cushion or limit the inward movement of the tread portion of the tire and also limit the degree to which the said tread portion of the tire may spring inwardly. The tire as a whole is thus rendered puncture proof, blow-out proof, rim cut proof, no inflation is required and it is unnecessary to carry an extra tire or outer casing. The tire, of course, also eliminates the usual and extra inner tubes.

What I claim is:—

The combination with a resilient tire casing substantially round in cross section, of an annular endless tubular and imperforate core round and continuous in cross section and having a diameter greater in cross section than one half of the internal diameter of said casing and less than the internal diameter of the casing, an annular spring-retaining metal strip fastened exteriorly to that face of the core which is disposed toward the rim and comprising a longitudinal rib which lies in contact with the core and marginal portions at opposite sides of said rib having a spaced relation to the core, and a circular series of springs each in the form of a transversely split annulus lying in supporting contact with the inside surface of the tread wall and side walls of the casing and in eccentric relation to the core, the extremities of each spring extending toward each other and being inserted between the side margins of said retaining strip and the core and abutting the rib of said strip.

In testimony whereof I affix my signature in presence of two witnesses.

CLAUDE W. STEWART.

Witnesses:
E. EDMONSTON, Jr.,
JAMES A. KOEHL.